(12) United States Patent
Qin (10) Patent No.: US 7,433,533 B2
(45) Date of Patent: Oct. 7, 2008

(54) VIDEO PERFORMANCE EVALUATION

(75) Inventor: Xiaochuan Qin, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 811 days.

(21) Appl. No.: 10/975,715

(22) Filed: Oct. 27, 2004

(65) Prior Publication Data
US 2006/0090010 A1   Apr. 27, 2006

(51) Int. Cl.
G06K 9/40 (2006.01)
G06K 9/42 (2006.01)
H04N 5/00 (2006.01)
G06F 3/06 (2006.01)

(52) U.S. Cl. .................. 382/254; 382/260; 348/608
(58) Field of Classification Search ......... 348/606–624; 358/447; 382/254, 260–265; 709/246; 710/53; 711/118
See application file for complete search history.

(56) References Cited

U.S. PATENT DOCUMENTS

2002/0090134 A1* 7/2002 Van Zon ................ 382/181
2003/0198405 A1* 10/2003 Ali ......................... 382/307
2005/0246433 A1* 11/2005 Carrigan et al. .......... 709/223

OTHER PUBLICATIONS

"Microsoft DirectX DirectShow Introduction to DirectShow," Microsoft Corporation, http://msdn.microsoft.com/library/en-us/directshow/htm/introductiontodirectshow.asp?frame=true, 1 page, website visited on Sep. 24, 2004.
"Sample Grabber Filter (DirectX 8.1 C++ Archive)," http://msdn.microsoft.com/archive/default.asp?url=archive/en-us/directx9_c/directx/htm/samplegrabberfilter.asp, 1 page, website visited on Sep. 28, 2004.
"DirectShow," http://www.gdcl.co.uk/dshow.htm, 1 page, website visited on Sep. 24, 2004.
"DirectShow for Developers," http://www.gdcl.co.uk/dshow_dev.htm, 1 page, website visited on Sep. 24, 2004.
"Component Object Model," http://www.gdcl.co.uk/com.htm, 1 page, website visited on Sep. 24, 2004.
"Filter Graph Manager," http://www.gdcl.co.uk/fgman.htm, 1 page, website visited on Sep. 24, 2004.
"How filter graphs are built," http://www.gdcl.co.uk/building.htm, 1 page, website visited on Sep. 24, 2004.
"Media types and pin connections," http://www.gdcl.co.uk/mediatype.htm, 2 pages, website visited on Sep. 24, 2004.
"Data transport and buffer negotiation," http://www.gdcl.co.uk/data.htm, 2 pages, website visited on Sep. 24, 2004.

* cited by examiner

*Primary Examiner*—Yon Couso
(74) *Attorney, Agent, or Firm*—Klarquist Sparkman, LLP (57) ABSTRACT

Techniques can be employed to automate evaluation of video performance. Video frames of a video presentation can be intercepted and information for the intercepted video frames can be recorded. Statistics such as frames per second or mean time before freeze can be calculated without observation by a human tester. An interceptor can be positioned in a componentized video processing chain without disrupting video processing. Components in the chain can be tested on an automated basis.

19 Claims, 12 Drawing Sheets

| Frame Number | Frame Arrival Time (ms) |
|---|---|
| 1 | 0 |
| 2 | 33 |
| 3 | 67 |
| 4 | 100 |
| 5 | 131 |
| ... | ... |
| 4500 | 148502 |
| 4501 | 148602 |
| 4502 | ... |

```
VidPerfMonitor.report
> ============================= <
FPS Distribution is:

FPS = 0      || iCount = 0
FPS = 1      || iCount = 0
FPS = 2      || iCount = 0
FPS = 3      || iCount = 3
FPS = 4      || iCount = 17
FPS = 5      || iCount = 4
FPS = 6      || iCount = 56
FPS = 7      || iCount = 24
FPS = 8      || iCount = 46
FPS = 9      || iCount = 25
FPS = 10     || iCount = 86
FPS = 11     || iCount = 23
FPS = 12     || iCount = 23
FPS = 13     || iCount = 45
FPS = 14     || iCount = 67
FPS = 15     || iCount = 191
FPS = 16     || iCount = 89
FPS = 17     || iCount = 233
FPS = 18     || iCount = 103
FPS = 19     || iCount = 112
FPS = 20     || iCount = 123
```

```
FPS = 21        || iCount = 167
FPS = 22        || iCount = 180
FPS = 23        || iCount = 288
FPS = 24        || iCount = 260
FPS = 25        || iCount = 233
FPS = 26        || iCount = 567
FPS = 27        || iCount = 2340
FPS = 28        || iCount = 47456
FPS = 29        || iCount = 953543
FPS = 30        || iCount = 2591132
FPS = 31        || iCount = 768565
FPS = 32        || iCount = 34456
FPS = 33        || iCount = 342
FPS = 34        || iCount = 12
FPS = 35        || iCount = 2
FPS = 36        || iCount = 0
FPS = 37        || iCount = 0
FPS = 38        || iCount = 0
FPS = 39        || iCount = 0
FPS = 40        || iCount = 0
```

Video Perfmonitor Summary:
g_Result.iTimeStart                : 632324994372330982 (ticks)
g_Result.iTimeEnd                  : 632333634372330982 (ticks)
g_Result.iTimeDuration             : 8640000000000 (ticks)
g_Result.iFPS_AVG                  : 29.891 (Frame Per second)
g_Result.iFPS_MAX                  : 35 (Frame Per second)
g_Result.iFPS_Min                  : 3 (Frame Per second)
iFPS_GlitchThresholdHigh           : 40 (Frame Per second)
iFPS_GlitchThresholdLow            : 10 (Frame Per second)
g_Result.iNumOfGlitches            : 33 (Times detected)
iTotalTimeDurationOfAllGlitches    : 342810 (milliseconds)
Video Quality is                   : 0.996 (1 - Time_during_Glitch/All_Time)

FIG. 11

SOFTWARE 1180 FOR EVALUATING
VIDEO PERFORMANCE

VIDEO PERFORMANCE EVALUATION

TECHNICAL FIELD

The technical field relates to video processing and, more specifically, video performance evaluation.

BACKGROUND

Digital video has become widespread and commonplace. However, some problems with digital video technology still remain. A persistent problem relates to the sheer size of video presentations.

To reduce the size of video presentations, frames of a video presentation are typically stored in an encoded format. The encoded format can do much to reduce the amount of resources required to store the video presentation. However, when the video is to be presented, it must be decoded by a video decoder (sometimes called a "codec"). The video decoder can be very complicated and resource-intensive software. Accordingly, when playing video, demands on the digital video player can be severe.

In some cases, decoding overloads the digital video player, leading to defects in the video presentation. For example, the presentation may freeze, or the number of frames presented per second may drop to a level that leads to a poor quality presentation.

Unfortunately, even a minor amount of defect in a video presentation is not very well tolerated by the average viewer. Viewers are accustomed to watching thousands of hours of video over a life time that have no or almost no defects. Thus, avoiding such defects is an important part of developing the decoders. Accordingly, the decoders must be thoroughly tested.

One possible technique for assuring video quality is to have a human tester watch video presentations and rate them manually. However, such an approach requires a human tester to attentively watch a lengthy video presentation that may have only a handful of defects.

Accordingly, there exists a need for improved video presentation performance evaluation.

SUMMARY

Various technologies can be used in relation to processing video. Such techniques can be used to assess video presentation performance in an automated fashion.

Video frames can be intercepted and information for the intercepted video frames can be recorded. For example, a time stamp can be recorded. Measures of performance such as frames per second or mean time before freeze can be calculated.

Interception can be performed by a component in a componentized video processing chain. For example, a component not processing the video content can be included in the chain and simply record information for frames without processing the frames' content.

The foregoing and other features and advantages will become more apparent from the following detailed description of disclosed embodiments, which proceeds with reference to the accompanying drawings.

DETAILED DESCRIPTION

EXAMPLE 1

Exemplary First System for Processing Video Frames

Figure 1:
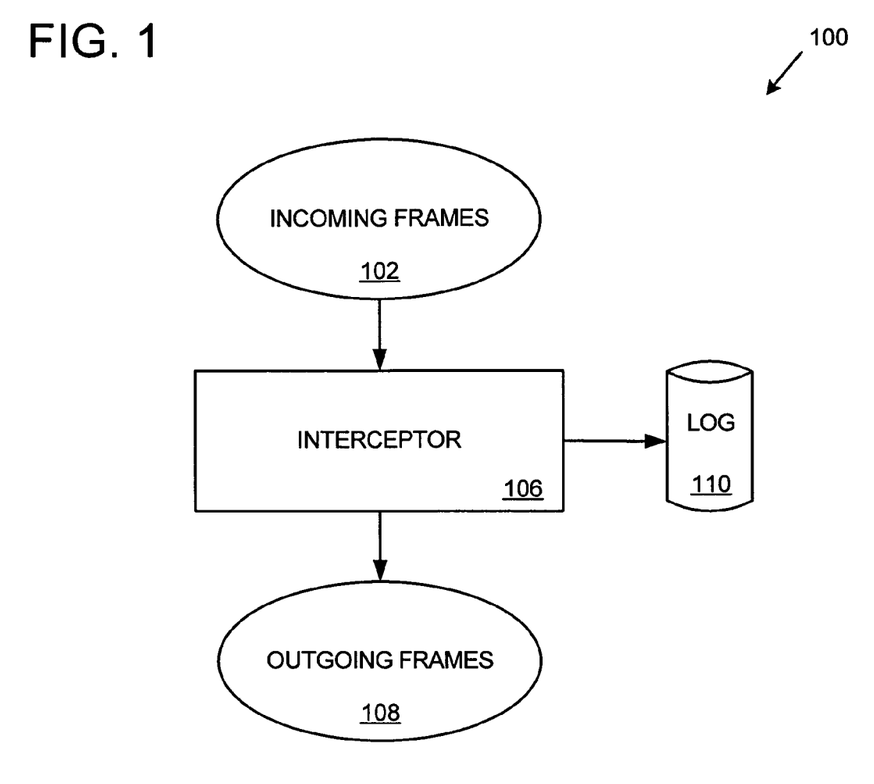
FIG. 1 is a block diagram showing a first exemplary system for processing a video presentation.

FIG. 1 is a block diagram showing a first exemplary system 100 for processing a video presentation.

In the example, a video presentation comprises a plurality of incoming frames 102. The frames can come from a variety of sources and may have already been processed before reaching the interceptor 106.

The interceptor 106 can be operable to intercept the incoming frames 102 to be rendered as part of the presentation. The interceptor can be operable to record information about the frames in a log 110.

The interceptor 106 can then pass the frames as outgoing frames 108. The outgoing frames 108 can be identical to the incoming frames 102 (e.g., the content of the frames need not be processed by the interceptor 106). In some implementations, the incoming frames 102 and outgoing frames 108 are indeed the same frames. For example, in practice, a representation of a single instance of a frame can be used as both an incoming frame 102 and an outgoing frame 108.

The outgoing frames 108 are typically ultimately rendered as part of a video presentation.

In some implementations, a log 110 may not be necessary because desired information can be calculated without having to store information about individual frames. Also, although the log 110 is shown as directly coupled to the interceptor 106, in practice a level of indirection can be used. For example, the interceptor 106 can call logic which accesses the log 110 on behalf of the interceptor 106.

EXAMPLE 2

Exemplary First Method for Processing Video Frames

Figure 2:
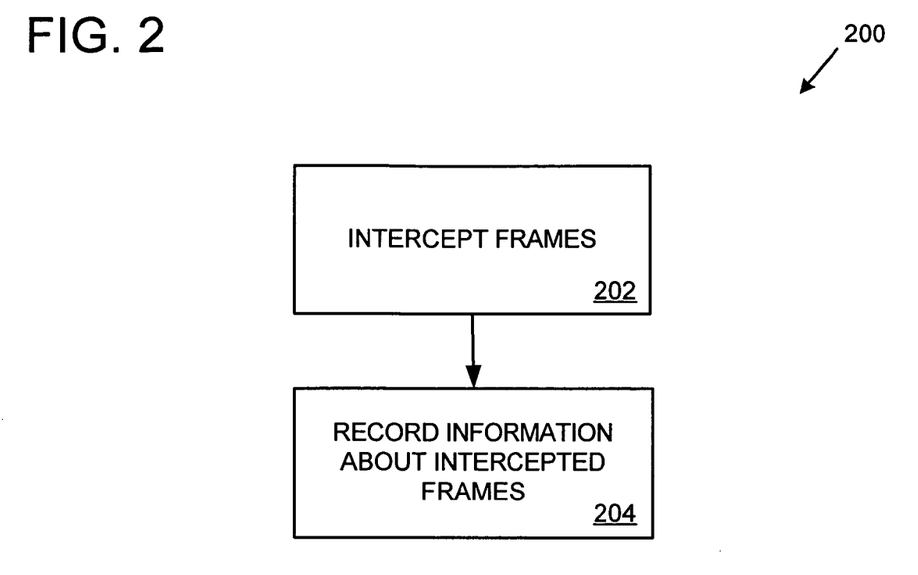
FIG. 2 is a flowchart showing a first exemplary method for processing video presentation, such as with the system shown in FIG. 1.

FIG. 2 is a flowchart showing a first exemplary method 200 for processing video presentation, such as with the system shown in FIG. 1.

At 202, frames (e.g., incoming frames of a video presentation) are intercepted.

At 204, information for the frames is recorded (e.g., by an interceptor). Such information can comprise a time stamp (e.g., an arrival time for a frame). Other processing can be accomplished, such as calculating frame arrival interval (e.g., which can be used to calculate frames per second). With the availability of arrival time, performance metrics such as frames per second and mean time before freeze can be calculated.

EXAMPLE 3

Exemplary Glitches

A glitch can include any abnormal processing of a video frame. For example, a frame may be rendered too early, too late, or not at all. Typically, such glitches can be noticed by an observer of the associate video presentation. A time period of one or more consecutive glitches (e.g., late frames) can be designated as a glitch-filled period.

EXAMPLE 4

Exemplary Mean Time Before Freeze

Mean time before freeze (MTBF) can measure the time period beginning with the start of video processing and ending with a software crash (e.g., when the video rendering software becomes non-responsive), which generally occurs as the result of a defect (e.g., bug) in the code being executed. Such a time period could be as small as a few seconds or even smaller, or as large as many days. Also, an MTBF might not be calculated in situations where video processing is stopped (e.g., by user intervention) before a crash occurs or a certain defect is encountered.

EXAMPLE 5

Exemplary Performance Metrics

In any of the examples described herein, a variety of performance metrics can be calculated. For example, frames per second and mean time before freeze can be calculated.

Additionally, a number of glitches can be determined. For example, one or more glitch thresholds (e.g., an upper threshold, a lower threshold, or both) can be set (e.g., 10 frames per second) to determine how many glitches occur (e.g., how many frames are rendered with a characteristic (e.g., frames per second) outside the threshold). Further, glitch-filled periods can be measured.

The total time taken up by glitches or glitch-filled periods can be measured. A video quality metric can be calculated based on glitch time. For example: Quality=1−(the total time of glitch-filled periods/the total time for video frames).

Thus, a quality metric can be calculated by determining a measure of frames per second for a plurality of video frames. Glitch-filled periods can then be identified based on one or more glitch thresholds (e.g., expressed in frames per second), where a glitch-filled period comprises consecutive frames having a frames-per-second measure outside the threshold. After calculating a total time for the glitch-filled periods, a video quality measurement can be calculated via the above formula.

Additionally, a frames-per-second distribution can be tracked to indicate how many frames were rendered within certain frames-per-second intervals. For example, the number of frames rendered at 30 frames per second can be counted, the number of frames rendered at 29 frames per second can be counted, and so forth (e.g., for a range from $FPS_1$ through $FPS_2$ frames per second). The distribution can then be presented as a report indicating the frames-per-second distribution of the frames.

An average frames per second can also be calculated (e.g., via the distribution described above).

Another metric can indicate the maximum frames per second measured (e.g., for any one frame). Another metric can indicate the minimum frames per second measured (e.g., for any one frame).

Any such metrics can be calculated based on stored information for frames (e.g., frame arrival time). In some cases, intermediate performance metrics (e.g., frame interval) can be calculated. Other metrics can be calculated based on such intermediate metrics.

EXAMPLE 6

Exemplary Lightweight Interceptor

In any of the examples described herein, the interceptor can do a minimal amount of processing so as to not disrupt video processing (e.g., to avoid side effects related to observing the arrival time of frames). The interceptor need not process video content (e.g., the video content of any of the frames). Thus, the interceptor can simply pass a frame from its input to its output. Additionally, the interceptor need not alter the video content or other content of the frames.

EXAMPLE 7

Exemplary Placement of Interceptor

In any of the examples described herein, the interceptor can be placed to intercept frames that have already been decoded (e.g., decompressed by a codec). In this way, the frame arrival time is associated with the frame presentation time and allows for accurate measurement of performance as perceived by a viewer when the video is presented.

EXAMPLE 8

Exemplary System for Evaluating Performance

Figure 3:
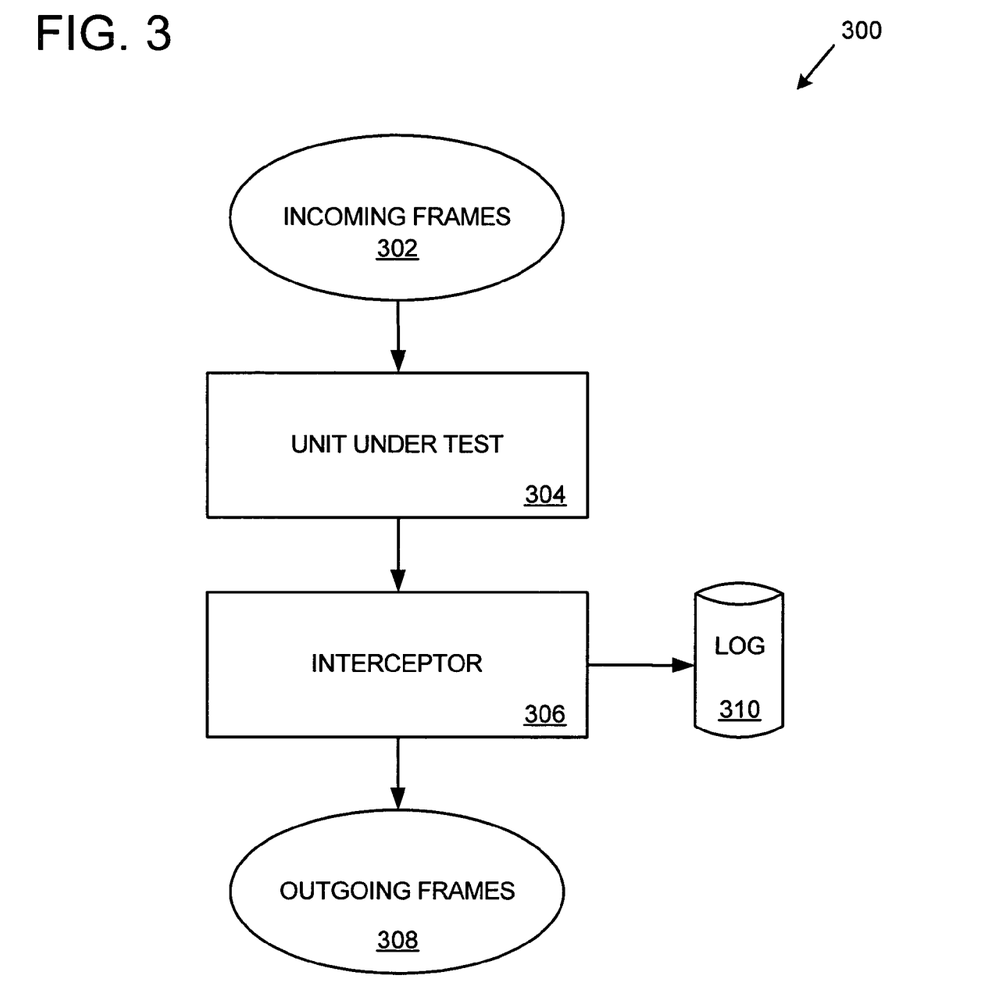
FIG. 3 is a block diagram showing an exemplary system for evaluating video performance.

FIG. 3 is a block diagram showing an exemplary system 300 for evaluating video performance. The system can accept incoming frames 302 and produce outgoing frames 308.

In the example, in addition to an interceptor 306 (e.g., as described in any of the examples) and a log 310 (e.g., as described in any of the examples), the system can include a unit under test 304.

The unit under test 304 can be any of a variety of video processing logic. For example, a codec can be tested via the shown arrangement. If the unit under test 304 exhibits acceptable behavior, then the system 300 has served to validate its quality. However, if the unit under test 304 exhibits poor performance metrics, the unit under test 304 can be improved (e.g., the source code modified) and retested.

More than one unit under test 304 can be tested. And in some cases, the unit under test may not be considered as a traditional part of the video processing. For example, the performance of a hard disk (e.g., its ability to support a particular frames per second goal) can be tested via the illustrated arrangement.

EXAMPLE 9

Exemplary Method for Evaluating Video Performance

Figure 4:
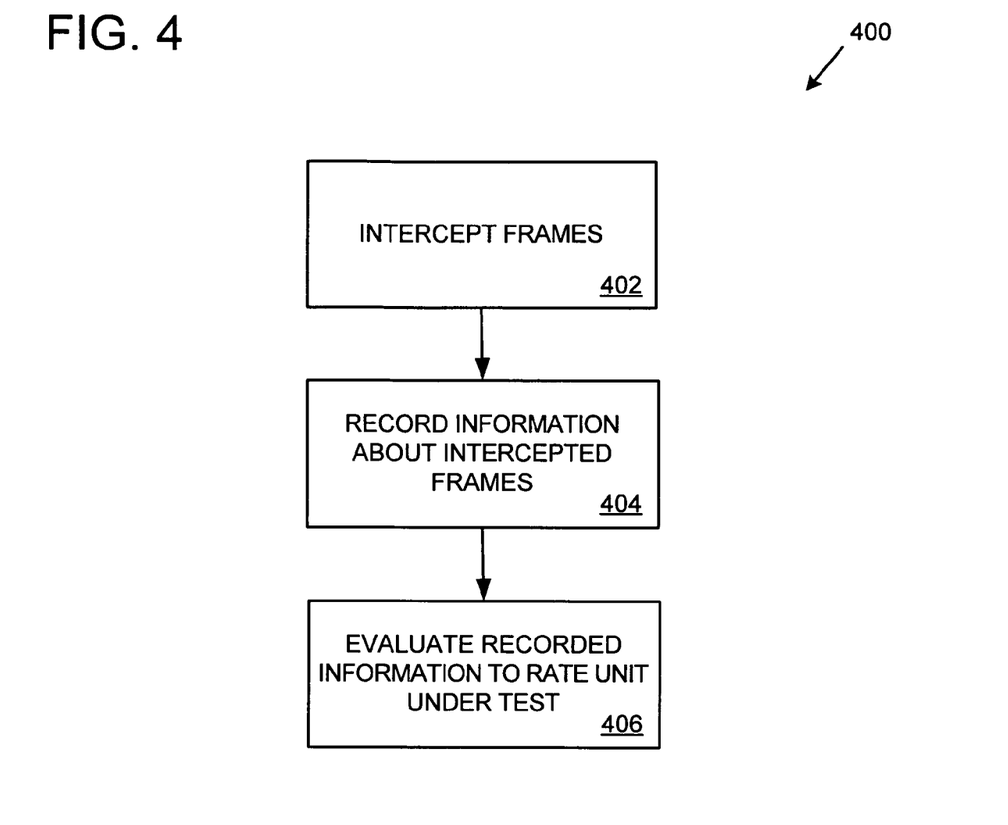
FIG. 4 is a flowchart showing a second exemplary method for evaluating video performance, such as with the system shown in FIG. 3.

FIG. 4 is a flowchart showing a second exemplary method 400 for evaluating video performance, such as with the system shown in FIG. 3.

At 402, frames (e.g., incoming video frames) are intercepted as described in any of the examples.

At 404, information about the frames is recorded as described in any of the examples.

At 406, the recorded information is evaluated to rate the unit under test. For example, a performance metric can be calculated.

EXAMPLE 10

Exemplary Componentized Video Processing Chain

In any of the examples described herein, video can be processed by a componentized video processing chain. In such an arrangement, the interceptor as described in any of the examples and the unit under test as described in any of the examples can be implemented as a component in the chain.

Components in the chain can be discrete video processing components (e.g., decoders, renderers, or other processors). In the case of an interceptor component, the interceptor component need not process the video content.

Figure 5:
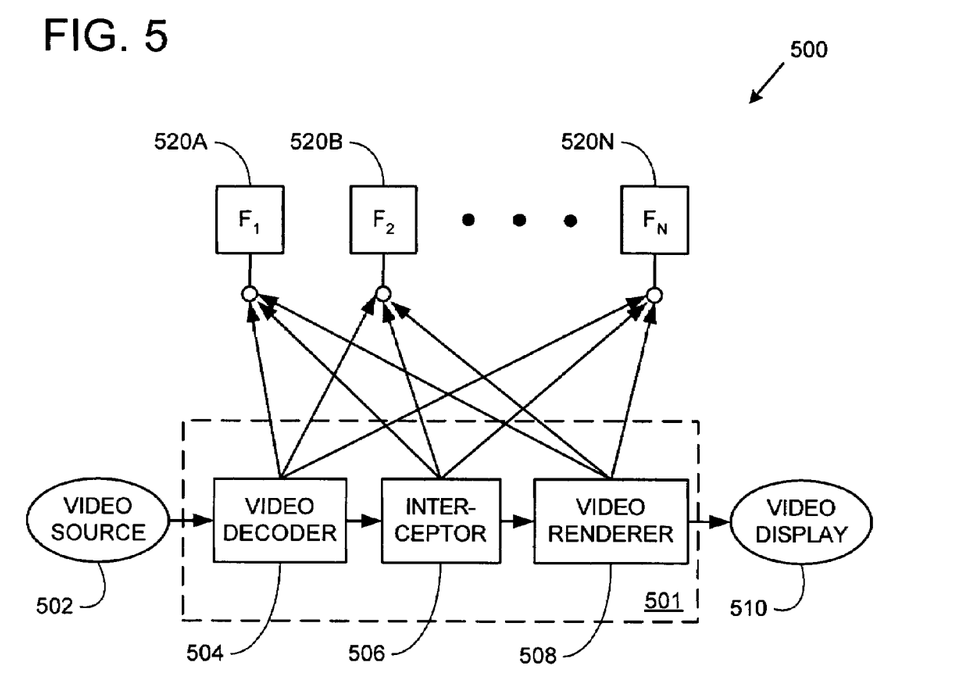
FIG. 5 is a block diagram showing an exemplary system for processing video that includes a componentized video processing chain.

FIG. 5 is a block diagram showing an exemplary system 500 for processing video that includes a componentized video processing chain 501. In the example, a video source 502 is processed by the processing chain 501 and ultimately results in a presentation of video on the video display 510.

In the example, the video processing chain 501 comprises a video decoder component 504, an interceptor component 506, and a video renderer component 508. Other components can be included as desired. A video source 502 is provided as input to the video processing chain 501. In the example, a series of frames $F_1$-$F_N$ 520A-520N is shown in the order in which the frames are to be processed (e.g., sequentially). Although a log is not shown, the interceptor component 506 can send information about frames to a log as described in any of the examples.

In any of the examples, frames can be represented as shown in FIG. 5. In the exemplary arrangement, the frames are represented as objects 520A-520N. A reference to an object corresponding to a frame can be provided to components in the chain. In this way, frames can remain stationary (e.g., in memory) as they are processed.

EXAMPLE 11

Exemplary Method for Componentized Video Processing Chain

Figure 6:
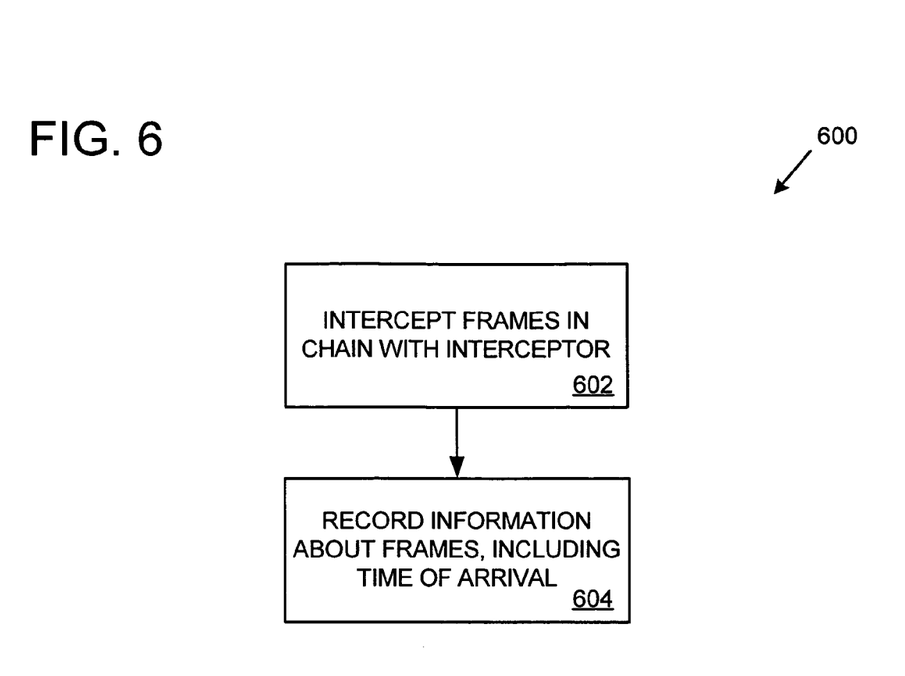
FIG. 6 is a flowchart showing an exemplary method for evaluating video processing performance in a componentized video processing chain, such as with the system shown in FIG. 5.

FIG. 6 is a flowchart showing an exemplary method 600 for evaluating video processing performance in a componentized video processing chain, such as with the system shown in FIG. 5.

At 602, video frames being processed by the chain, such as by the video processing chain 501 of FIG. 5, are intercepted.

At 604, information about the frames (e.g., time of arrival) is recorded as described in any of the examples. For example, a time of arrival for a frame can be recorded. The recorded information can be used to calculate any of the exemplary performance metrics.

EXAMPLE 12

Exemplary Video Sources

In any of the examples described herein, a video source can be any data that is ultimately renderable as a video presentation on a video display. Typically, such a source (e.g., the source 502 of FIG. 5) represents a set of frames making up a video presentation. However, a video presentation can be represented by any of a number of techniques.

In practice, such a source can be stored as a file on a persistent medium (e.g., as an MPEG video, WINDOWS media file, QUICKTIME video file, or the like).

EXAMPLE 13

Exemplary Implementation in DirectShow Software

Any of the technologies described in the examples can be implemented as part of a MICROSOFT DIRECTSHOW software filter graph. The MICROSOFT DIRECTSHOW software architecture supports a componentized video processing chain in the form of a filter graph.

For example, a bypass filter can be included in the filter graph as an interceptor, and the bypass filter can record information about frames (e.g., via calls to a callback function that records the information). A lightweight filter (e.g., Sample-Grabber) can be used as an interceptor. The bypass filter need not process video content of the video frames.

Figure 7A:
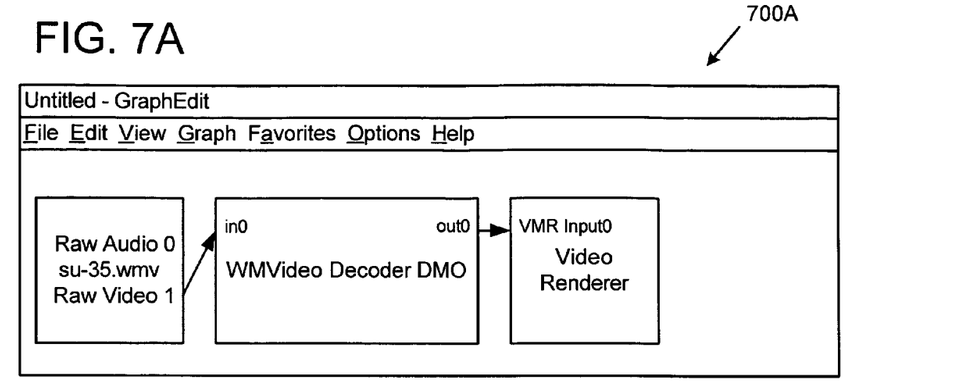
FIGS. 7A-B are screen shots showing an exemplary arrangement without a bypass filter in the filter graph and with a bypass filter in the filter graph, respectively.
Figure 7B:
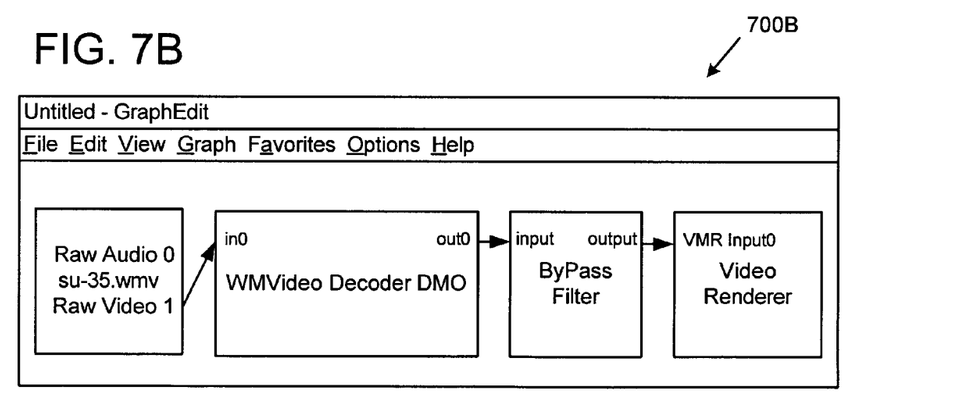

FIG. 7A is a screen shot showing an exemplary arrangement 700A without a bypass filter in the filter graph. FIG. 7B is a screen shot showing an exemplary arrangement 700B with a bypass filter in the filter graph.

EXAMPLE 14

Exemplary Method for Configuring a Bypass Filter

Figure 8:
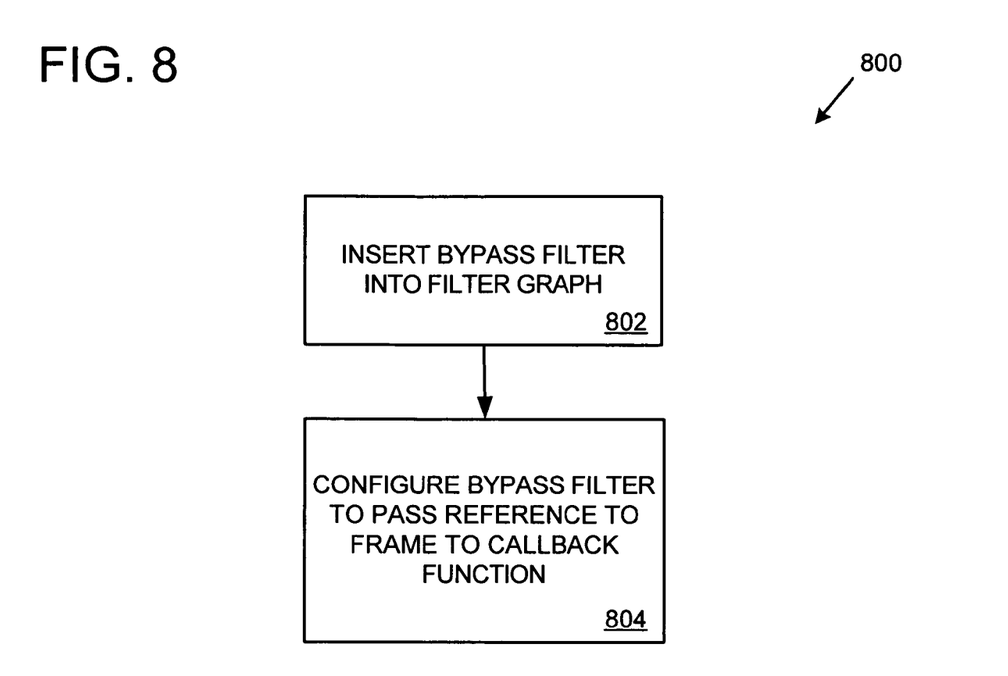
FIG. 8 is a block diagram of an exemplary method for configuring a bypass filter to pass a reference to a frame to a callback function.

FIG. 8 is a block diagram of an exemplary method 800 for configuring a bypass filter to pass a reference to a frame to a callback function.

At 802, a bypass filter is inserted into the filter graph.

At 804, the bypass filter is configured to pass a reference to a frame to a callback function.

EXAMPLE 15

Exemplary Implementation in Video Player

Any of the technologies described herein can be implemented in a variety of video players. For example, software-based video players for use in general purpose computers can be supported as well as consumer electronics style digital video players.

EXAMPLE 16

Exemplary Network Implementation

In any of the examples described herein, video performance can be evaluated and information regarding the evaluation can be transmitted to a developer over a network. For example, a developer can test a video presentation remotely by having a remote system perform a video performance evaluation as described in any of the examples herein and send results of the evaluation (e.g., metrics) back to the developer (e.g., over a network).

EXAMPLE 17

Exemplary Field Testing

In any of the examples described herein, video performance of a video presentation can be evaluated at a remote (e.g., customer) location and information regarding the evaluation can be transmitted back to a developer over a network. For example, a user such as a customer can purchase a video source player (e.g., a DVD player) and play it in the comforts of his or her own home. Any of the systems and methods described herein can be implemented in the video source player to provide feedback regarding video presentation of a video source (e.g., a DVD) played by the video source player to a developer (e.g., the manufacturer of the video source player). In such an implementation, the developer can be kept abreast of video performance evaluations performed at a remote location (e.g., wherever the user uses the video source player).

EXAMPLE 18

Exemplary Testing of Video Encoding

Instead of testing a video source decoding component (e.g., a codec), whatever encoding technique was used to compress a given video source can be tested. For example, a certain encoding technique can be tested by performing a video performance evaluation on each of several different video sources that were encoded using the encoding technique. Video performance metrics can be calculated for each video source and evaluated cumulatively to determine performance metrics for the encoding technique itself. A different encoding technique may result in a different level of performance.

EXAMPLE 19

Exemplary Video Frame Record Information

A video frame can contain much information in addition to the video information itself. For example, a video frame can contain timing information (e.g., a timestamp), encoding information (e.g., what encoding technique was used), and/or various other types of information regarding the video frame. Such information can be used in the determination of video performance metrics. For example, if a timestamp is provided for a video frame during the encoding phase, then it can be compared with a second timestamp determined during processing (e.g., when decoded) to assist in determining whether the frame was delivered too late (e.g., it arrived later than it was expected) or too soon (e.g., it arrived earlier than it was expected). Statistics related to such determinations can be provided to indicate performance.

EXAMPLE 20

Exemplary Metric Calculator

In any of the examples described herein, performance metrics can be calculated by an interceptor or by a separate metric calculator. As part of calculating performance metrics, the metric calculator can access a log that contains information about a video source captured by the interceptor. Alternatively, the metric calculator can perform its calculations without accessing such a log or in systems where such a log does not exist. A metric calculator can calculate performance metrics real-time (e.g., during processing of a video source as part of a video presentation) or after processing (e.g., by referring to a log containing information regarding processing of the video source that was captured during the processing).

EXAMPLE 21

Exemplary Thresholds

A threshold may be applied to any video performance metric that is calculated by way of any of the examples described herein. For example, a threshold value can be determined and applied with respect to frames per second (e.g., 24 frames per second). During video processing, if the measured or calculated frames per second value falls outside (e.g., exceeds or drops below) the threshold value, an action (e.g., an alert) can occur to signal a possible need for attention (e.g., by a developer). Similarly, a threshold value can be determined and applied with respect to mean time before freeze.

As described herein, other thresholds can be used. For frames-per-second thresholds can be used to determine glitches and glitch-filled periods.

EXAMPLE 22

Exemplary Log

In any of the examples described herein, a log can be used as part of a video performance evaluation.

Figure 9:
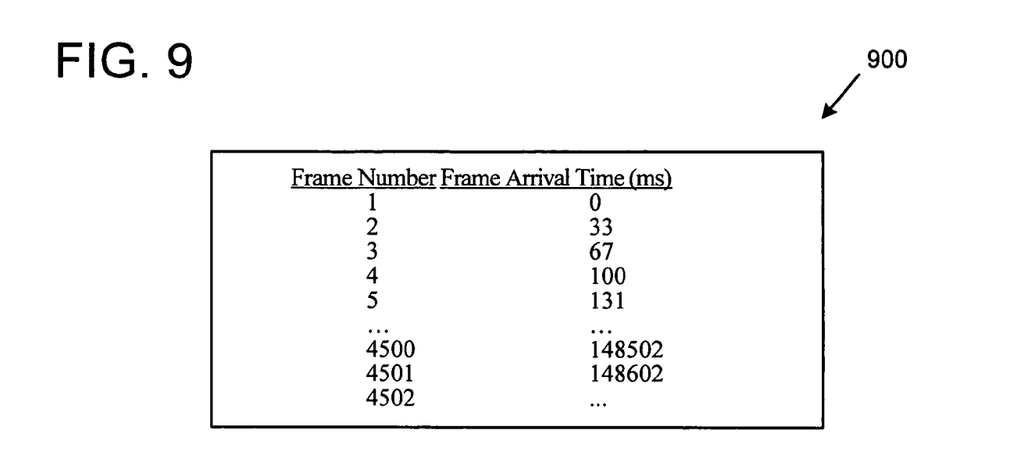
FIG. 9 is a block diagram of an exemplary output log.

FIG. 9 illustrates an exemplary output log 900 containing information regarding video frames such as frame number (e.g., an identifier for each video frame) and frame arrival time (e.g., the amount of time it takes for a video frame to reach a certain point during processing). In the example, if a glitch threshold is set for 1 second, then a glitch has occurred at frame 4501 because it arrived 1 second later than the preceding frame 4500, which might have resulted in a visual flaw.

Figure 10A:
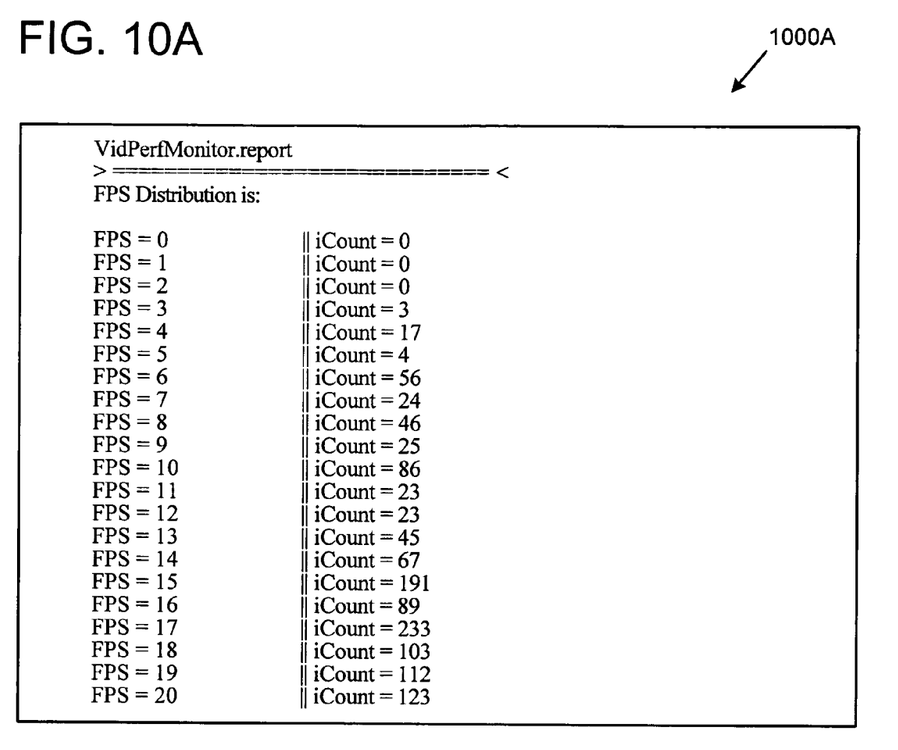
FIGS. 10A-B are block diagrams of an exemplary video performance log.
Figure 10B:
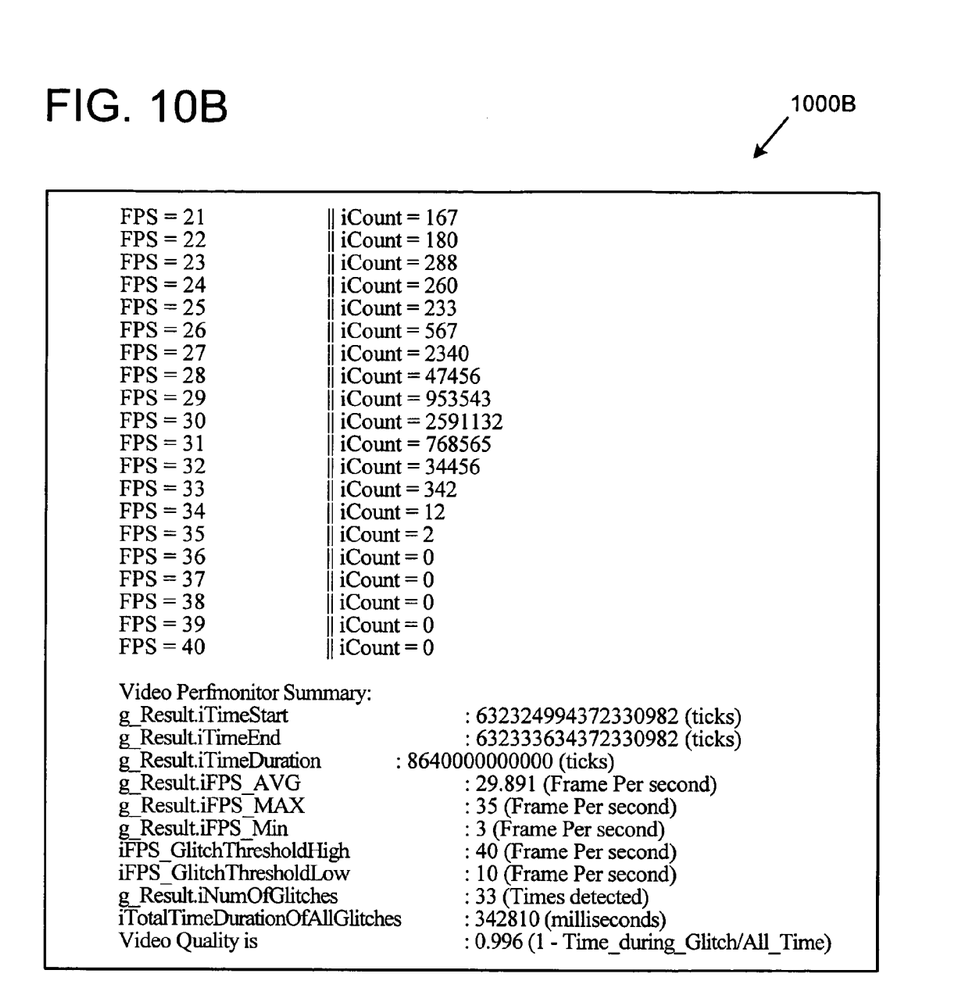

FIGS. 10A-B illustrate an exemplary video performance log 1000A-B containing information regarding video performance during an extended period of time (e.g., 24 continuous hours). The information provided in the example includes various metrics regarding frames per second (FPS) (e.g., distribution, maximum, minimum, and average), start time, end time, duration, number of glitch-filled periods, and total time of glitches. Additionally, the example provides a calculation of video quality based on time of glitches and video processing time (e.g., 1 minus the total time of glitches divided by the total time of video processing).

Glitch thresholds (e.g., high and low) can be used as part of the metric determination process. For example, a glitch threshold (e.g., 10 frames per second) can be set to determine how many glitches occur (e.g., when the frames per second drops below the glitch threshold), how many glitch-filled periods occurred, how much time the glitches take up (e.g., a total time duration of all glitches encountered), or any combination thereof for the frames.

In the example, a total of 33 glitch-filled periods have been identified. This represents 33 periods encountered during processing, during each of which at least one frame was processed outside the thresholds (e.g., arrived early, late, or skipped). The high glitch threshold in the example is 40 and the low glitch threshold is 10. A look at the FPS distribution reveals that no situations were encountered where the FPS was higher than 40, but there were several situations encountered where the FPS was lower than 10 (e.g., there were three situations in which the FPS was three).

EXAMPLE 23

Exemplary Advantages

In any of the examples described herein, an automated technique can be applied. In such a technique, video performance can be monitored by computer software without need for intervention by a human tester.

Such an approach can have the advantage of being able to reliably and uniformly test video processing without having to allocate a human tester to the job. So, for example, a single anomaly (e.g., glitch) in a two-hour video presentation can be reliably and uniformly detected by software without having to employ a human tester to watch the entire video presentation.

EXAMPLE 24

Exemplary Computing Environment

Figure 11:
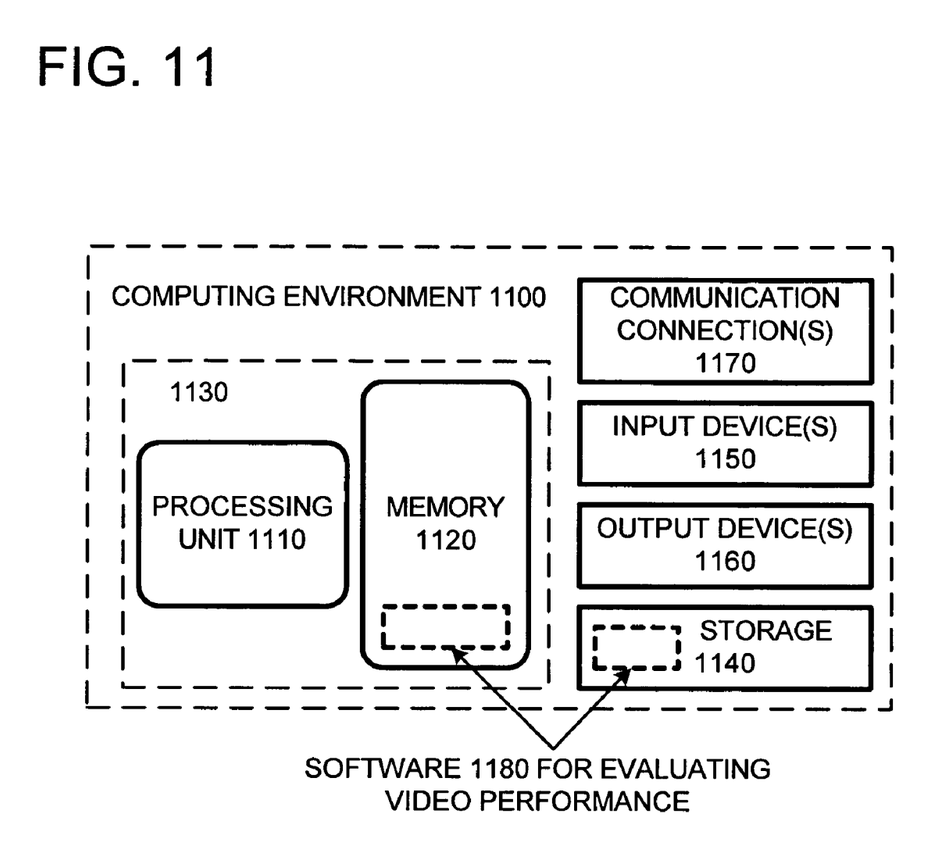
FIG. 11 shows a generalized example of a suitable computing environment in which the described techniques can be implemented.

FIG. 11 illustrates a generalized example of a suitable computing environment 1100 in which the described techniques can be implemented. The computing environment 1100 is not intended to suggest any limitation as to scope of use or functionality of the invention, as the present invention may be implemented in diverse general-purpose or special-purpose computing environments.

With reference to FIG. 11, the computing environment 1100 includes at least one processing unit 1110 and memory 1120. In FIG. 11, this most basic configuration 1130 is included within a dashed line. The processing unit 1110 executes computer-executable instructions and may be a real or a virtual processor. In a multi-processing system, multiple processing units execute computer-executable instructions to increase processing power. The memory 1120 may be volatile memory (e.g., registers, cache, RAM), non-volatile memory (e.g., ROM, EEPROM, flash memory, etc.), or other computer-readable media. The memory 1120 stores software 1180 implementing a video performance evaluation tool (e.g., the video performance evaluation tool 300 of FIG. 3).

A computing environment may have additional features. For example, the computing environment 1100 includes storage 1140, one or more input devices 1150, one or more output devices 1160, and one or more communication connections 1170. An interconnection mechanism (not shown) such as a bus, controller, or network interconnects the components of the computing environment 1100. Typically, operating system software (not shown) provides an operating environment for other software executing in the computing environment 1100, and coordinates activities of the components of the computing environment 1100.

The storage 1140 may be removable or non-removable, and includes magnetic disks, magnetic tapes or cassettes, CD-ROMs, CD-RWs, DVDs, or any other computer-readable media which can be used to store information and which can be accessed within the computing environment 1100. The storage 1140 stores software 1180 containing instructions for video performance evaluation tool (e.g., the video performance evaluation tool 300 of FIG. 3).

The input device(s) 1150 may be a touch input device such as a keyboard, mouse, pen, or trackball, a voice input device, a scanning device, or another device that provides input to the computing environment 1100. For audio, the input device(s) 1150 may be a sound card or similar device that accepts audio input in analog or digital form, or a CD-ROM reader that provides audio samples to the computing environment. The output device(s) 1160 may be a display, printer, speaker, CD-writer, or another device that provides output from the computing environment 1100.

The communication connection(s) 1170 enable communication over a communication medium to another computing entity. The communication medium conveys information such as computer-executable instructions, audio/video or other media information, or other data in a modulated data signal. A modulated data signal is a signal that has one or more of its characteristics set or changed in such a manner as to encode information in the signal. By way of example, and not limitation, communication media include wired or wireless techniques implemented with an electrical, optical, RF, infrared, acoustic, or other carrier.

Communication media can embody computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. Communication media include wired media such as a wired network or direct-wired connection, and wireless media such as acoustic, RF, infrared and other wireless media. Combinations of any of the above can also be included within the scope of computer readable media. The techniques herein can be described in the general context of computer-executable instructions, such as those included in program modules, being executed in a computing environment on a target real or virtual processor. Generally, program modules include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing environment.

EXAMPLE 25

Methods in Computer-Readable Media

Any of the methods described herein can be performed by computer-executable instructions (e.g., stored on or encoded in one or more computer-readable media).

ALTERNATIVES

The technologies from any example can be combined with the technologies described in any one or more of the other examples. The technologies can also or alternatively be applied to audio. In view of the many possible embodiments to which the principles of the invention may be applied, it should be recognized that the illustrated embodiments are examples of the invention and should not be taken as a limitation on the scope of the invention. Rather, the scope of the invention includes what is covered by the following claims. I therefore claim as my invention all that comes within the scope and spirit of these claims.

I claim:

1. One or more computer-readable media having stored thereon computer-executable instructions for performing a method comprising:
    intercepting a plurality of video frames to be rendered for presentation as part of a video presentation;
    recording frame arrival times for respective of the plurality of intercepted video frames; and
    determining a performance metric for the video presentation based at least in part upon the frame arrival times of the plurality of intercepted video frames.

2. The one or more computer-readable media of claim 1, wherein determining the performance metric comprises:
    via the frame arrival times for respective of the plurality of intercepted video frames, determining a measure of frames per second for the video presentation.

3. The one or more computer-readable media of claim 1, wherein determining the performance metric comprises:
    via the frame arrival times for respective of the plurality of intercepted video frames, determining a measure of mean time before freeze for the video presentation.

4. The one or more computer-readable media of claim 1, wherein determining the performance metric comprises:
    calculating a frame interval for the plurality of video frames based on the frame arrival times for respective of the plurality of intercepted video frames.

5. The one or more computer-readable media of claim 1, wherein the video presentation is processed by a componentized video processing chain.

6. The one or more computer-readable media of claim 5, wherein the intercepting is performed by a component in the video processing chain not processing video content of the video frames.

7. The one or more computer-readable media of claim 1, wherein the video presentation is processed by a filter network.

8. The one or more computer-readable media of claim 7, wherein the filter network is created within a DirectShow software architecture.

9. One or more computer-readable media having stored thereon computer-executable instructions for performing a method comprising:
    intercepting a plurality of video frames to be rendered for presentation as part of a video presentation;
    recording information for the plurality of intercepted video frames;
    determining a measure of frames per second for the plurality of video frames;
    based on at least one glitch threshold expressed as a number of frames per second, identifying glitch-filled periods for the video frames, wherein a glitch-filled period comprises one or more consecutive frames having a frames per second measure outside the glitch threshold;
    determining a total time for the glitch-filled periods; and
    calculating a video quality measurement via the total time for the glitch-filled periods and a total time for the plurality of video frames.

10. A system for testing video performance, comprising:
    an interceptor operable to intercept at least one video frame of a video presentation without processing content of the at least one video frame;
    a log operable to store information for the at least one intercepted video frame, wherein the information for the at least one intercepted video frame is based at least on part on an arrival time of the at least one video frame at the interceptor; and
    a metric calculator configured to calculate a performance metric for the at least one intercepted video frame via the log.

11. The system of claim 10, wherein the performance metric comprises a measure of frames per second for the at least one video frame.

12. The system of claim 10, wherein the performance metric comprises a measure of mean time before freeze for the at least one video frame.

13. The system of claim 10, wherein the interceptor comprises a SampleGrabber filter.

14. A method comprising:
    providing a video source file to a componentized video processing chain, wherein the componentized video processing chain comprises a DirectShow filter graph;
    decoding the video source file within the componentized video processing chain;
    performing an analysis of video frames originating from the video source file within the componentized video processing chain, wherein performing the analysis comprises intercepting a plurality of video frames from the video source file with a SampleGrabber filter; and
    determining at least one video performance metric based on the analysis.

15. The method of claim 14, wherein determining at least one video performance metric comprises calculating a measure of frames per second for the video source file.

16. The method of claim 14, wherein determining at least one video performance metric comprises calculating a measure of mean time before freeze for the video source file.

17. The system of claim 10 wherein the system further comprises a componentized video processing chain configured to process the video presentation.

18. The system of claim 10 wherein the system further comprises a filter network configured to process the video presentation.

19. The system of claim 18 wherein the filter network is created within a DirectShow software architecture.

* * * * *